US012106513B2

United States Patent
Struckmeier

(10) Patent No.: US 12,106,513 B2
(45) Date of Patent: Oct. 1, 2024

(54) METHOD AND FLAT BED MACHINE TOOL FOR DETECTING A FITTING POSITION OF A SUPPORTING BAR

(71) Applicant: TRUMPF Werkzeugmaschinen SE + Co. KG, Ditzingen (DE)

(72) Inventor: Frederick Struckmeier, Heimsheim (DE)

(73) Assignee: TRUMPF WERKZEUGMASCHINEN SE + CO. KG, Ditzingen (DE)

( * ) Notice: Subject to any disclaimer, the term of this patent is extended or adjusted under 35 U.S.C. 154(b) by 84 days.

(21) Appl. No.: 18/159,099

(22) Filed: Jan. 25, 2023

(65) Prior Publication Data

US 2023/0186516 A1   Jun. 15, 2023

Related U.S. Application Data

(63) Continuation of application No. PCT/EP2021/071593, filed on Aug. 2, 2021.

(30) Foreign Application Priority Data

Aug. 7, 2020   (DE) .................... 10 2020 120 887.1

(51) Int. Cl.
   *G06T 7/73*      (2017.01)
   *B23K 37/04*     (2006.01)
   (Continued)

(52) U.S. Cl.
   CPC ............ *G06T 7/74* (2017.01); *B23K 37/0408* (2013.01); *G06T 5/10* (2013.01); *G06T 5/50* (2013.01);
   (Continued)

(58) Field of Classification Search
   CPC ...................................................... G06T 7/74
   See application file for complete search history.

(56) References Cited

U.S. PATENT DOCUMENTS

| 2002/0088952 A1 | 7/2002 | Rao et al. |
| 2010/0064870 A1 | 3/2010 | Olsen |

(Continued)

FOREIGN PATENT DOCUMENTS

| CN | 101733558 B | 5/2012 |
| CN | 204867817 U | 12/2015 |

(Continued)

OTHER PUBLICATIONS

Struckmeier et al., Measuring the supporting slats of laser cutting machines using laser triangulation, The International Journal of Advanced Manufacturing Technology, Jun. 2020, pp. 3819-3833, vol. 108, Springer, Germany, DOI 10.1007/s00170-020-05640-z.

*Primary Examiner* — Young Lee
(74) *Attorney, Agent, or Firm* — LEYDIG, VOIT & MAYER, LTD.

(57) ABSTRACT

A method detects a suspension position of a supporting bar in a pallet, having supporting bars along a longitudinal direction, each with multiple supporting bar tips along a main direction of extent. The supporting bar tips define a supporting plane. A two-dimensional contrast-image dataset of the pallet is created, its pixels being assigned a pixel value and a pixel-area unit of the supporting plane. The contrast-image dataset has regions that are assigned to the supporting bar tips as local pixel-value extremes in a uniform pixel-value background. A longitudinal position is determined in the contrast-image dataset of the regions that are assigned to the supporting bar tips a supporting bar using the local pixel-value extremes. The suspension position of the supporting bar in the pallet is deduced based on the longitudinal (Continued)

position in the contrast-image dataset and an extent of the pixel-area unit in the longitudinal direction.

19 Claims, 7 Drawing Sheets

(51) Int. Cl.
| | | |
|---|---|---|
| *G06T 5/10* | (2006.01) | |
| *G06T 5/50* | (2006.01) | |
| *G06T 5/94* | (2024.01) | |
| *G06T 7/00* | (2017.01) | |
| *H04N 23/21* | (2023.01) | |
| *H04N 23/74* | (2023.01) | |

(52) U.S. Cl.
CPC ................ *G06T 5/94* (2024.01); *G06T 7/001* (2013.01); *H04N 23/21* (2023.01); *H04N 23/74* (2023.01); *G06T 2207/10048* (2013.01); *G06T 2207/30108* (2013.01)

(56) References Cited

U.S. PATENT DOCUMENTS

| | | |
|---|---|---|
| 2010/0132526 A1 | 6/2010 | Wahl et al. |
| 2016/0140420 A1 | 5/2016 | Di Venuto Dayer, V et al. |
| 2017/0109874 A1 | 4/2017 | Hallasch et al. |
| 2017/0235293 A1 | 8/2017 | Shapiro et al. |
| 2018/0018778 A1 | 1/2018 | Haverkamp et al. |
| 2020/0226413 A1 | 7/2020 | Ye |

FOREIGN PATENT DOCUMENTS

| | | |
|---|---|---|
| CN | 105057899 B | 8/2016 |
| CN | 108568624 A | 9/2018 |
| DE | 10115502 A1 | 10/2002 |
| DE | 102014212682 A1 | 1/2016 |
| DE | 102015205738 A1 | 10/2016 |
| DE | 202020101810 U1 | 7/2020 |
| DE | 102019104649 A1 | 8/2020 |
| EP | 1176636 A2 | 1/2002 |
| EP | 3338946 A1 | 6/2018 |
| WO | WO 2008151839 A1 | 12/2008 |
| WO | WO 2019042232 A1 | 3/2019 |
| WO | WO 2021215429 A1 | 10/2021 |

METHOD AND FLAT BED MACHINE TOOL FOR DETECTING A FITTING POSITION OF A SUPPORTING BAR

CROSS REFERENCE TO RELATED APPLICATIONS

This application is a continuation of International Application No. PCT/EP2021/071593 (WO 2022/029091 A1), filed on Aug. 2, 2021, and claims benefit to German Patent Application No. DE10 2020 120 887.1, filed on Aug. 7, 2020. The aforementioned applications are hereby incorporated by reference herein.

FIELD

The present disclosure relates to a method for detecting a suspension position of a supporting bar in a pallet, which is intended for use with a flatbed machine tool, in particular a laser-cutting or plasma-cutting flatbed machine tool. The present disclosure also relates to a flatbed machine tool suitable for carrying out the method.

BACKGROUND

Flatbed machine tools, in particular laser-cutting or plasma-cutting flatbed machine tools, usually have a machine area in which the (for example laser) machining takes place. The machine area is assigned upstream (and optionally downstream) depositing areas for the raw material and/or the cut material. In the case of flatbed machine tools, material panels (for example metal sheets) to be machined can be fed to the machine area on a pallet. A pallet usually comprises an arrangement of supporting bars, by means of which the material panel to be machined can be mounted in a supporting plane. Depending on the embodiment, supporting bars may be laid only at certain positions of the pallet.

The pallet may be for example part of a pallet changer, which represents a depositing area upstream of the flatbed machine tool. After the machining, there may be a large number of cut workpieces on the pallet. The workpieces may be removed from the pallet in a sorting process manually by an operator or in a (partly) automated manner. The relative position between the workpiece produced and supporting structures on the pallet is of importance both for the production process and for the sorting process.

The supporting bars are usually configured in the form of a plate and have evenly spaced-apart supporting tips, which are formed along one edge/side of the supporting bar. The supporting bars are inserted vertically with upwardly pointing supporting tips, in order to form many supporting points, which define a supporting plane, for a material panel and the cut workpieces. In the inserted state, multiple supporting bars run parallel to one another. The supporting bars are arranged adjustably in their distance from one another along a longitudinal extent of the pallet and can be suspended, for example on a frame of the pallet, at equally spaced (suspended) positions. It is thus possible to configure the arrangement of the supporting bars of a pallet according to requirements, i.e., to choose the positions of the supporting bars along the longitudinal extent for example specifically for a machining order. In the region of the supporting tips there form supporting areas in which the supporting bars can be in contact with a material panel mounted in the supporting plane.

Modern nesting approaches also allow a material panel that is to be machined to be occupied with workpieces to be cut out in accordance with a given supporting bar configuration. In particular, the workpieces are in this case aligned with regard to the position of the supporting bar tips or the supporting areas. Occupying the panel with workpieces on the basis of the position of the supporting bars allows wearing of the supporting bar tips to be reduced and the quality of the process to be increased, by for example avoiding the tilting of workpieces and subsequent colliding of the tilted workpiece with a cutting head of the flatbed machine tool or by adopting specific (less damaging) piercing positions for the laser. The starting point for occupying the panel with workpieces on the basis of the position of the supporting bars or the supporting areas is knowledge of the supporting bar configuration intended to be used, which is dictated inter alia by the suspension positions of the supporting bars. Since, however, it is not known which supporting bars have been fitted, under some circumstances not all applications of the flatbed machine tool can take the supporting bar positions into account.

The position of the supporting bars may be detected, for example, by means of a distance sensor system (for example fastened to the cutting head) within the machine area or by laser triangulation. Such methods, however, entail unproductive downtimes due to the "scanning" of the empty pallet.

SUMMARY

In an embodiment, the present disclosure provides a method that detects a suspension position of a supporting bar in a pallet, which is fitted with a plurality of supporting bars along a longitudinal direction. Each of the supporting bars have multiple supporting bar tips along a main direction of extent, which is aligned transversely to the longitudinal direction of the pallet. The supporting bar tips of the plurality of supporting bars define a supporting plane. The method includes: creating a two-dimensional contrast-image dataset of the pallet having a plurality of image pixels, each of the image pixels being assigned a pixel value and a pixel-area unit of the supporting plane, and the contrast-image dataset having regions that are assigned to the supporting bar tips as local pixel-value extremes in a uniform pixel-value background; determining a longitudinal position in the contrast-image dataset of the regions that are assigned to the supporting bar tips of one of the plurality of supporting bars using the local pixel-value extremes; and deducing the suspension position of the supporting bar in the pallet on the basis of the longitudinal position in the contrast-image dataset and an extent of the pixel-area unit in the longitudinal direction.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
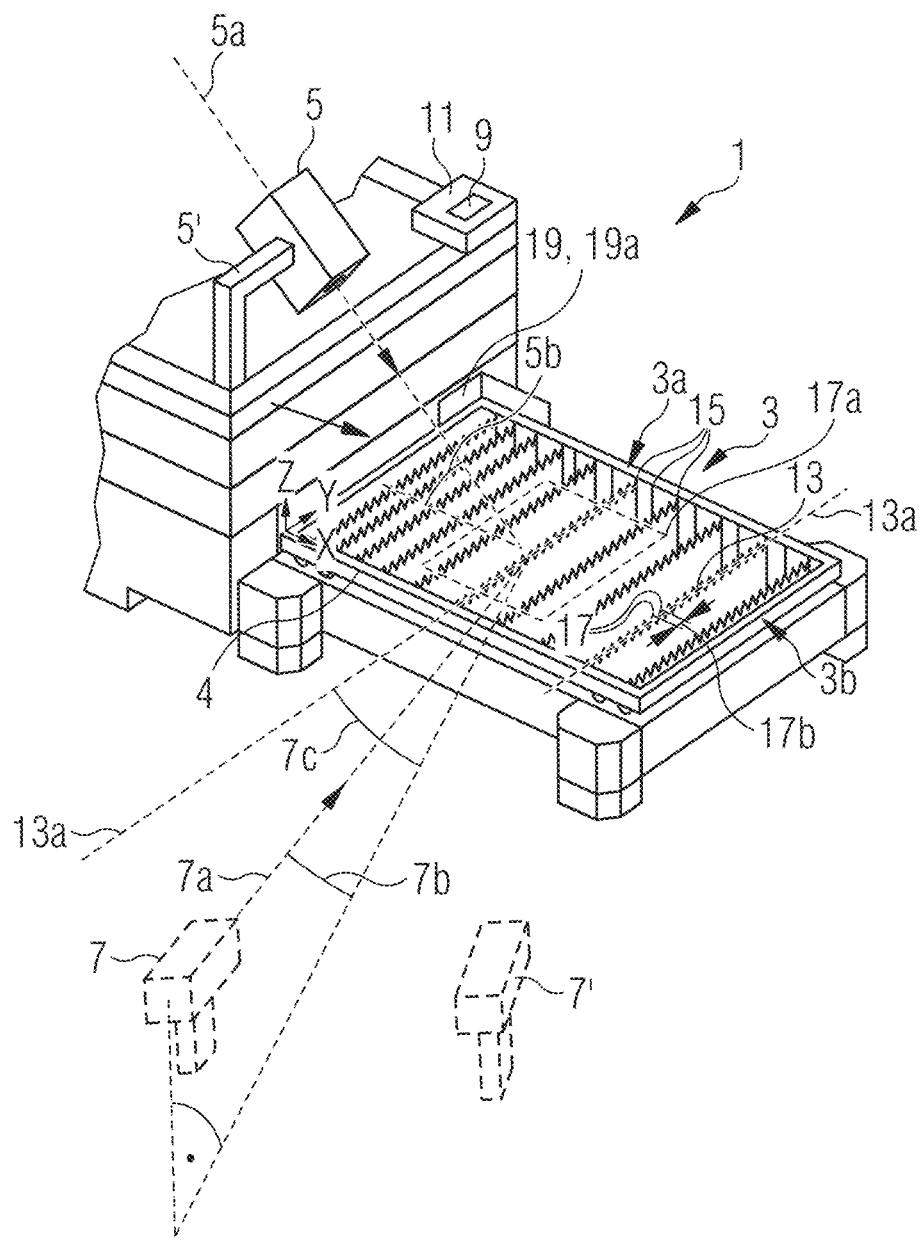
FIG. 1 shows a schematic three-dimensional representation of a flatbed machine tool with a pallet fitted with multiple supporting bars.

One aspect of this provides a method for detecting the suspension position of a supporting bar and/or a supporting bar tip The method can be carried out, in particular, even under adverse conditions, frequently encountered in practice, for example in a situation where there is undefined illumination or in a case where the supporting bar tips are worn or affected by slag. The method produces results that are as robust, quick and accurate as possible, in spite of the states of the surfaces of supporting bars occurring.

In one aspect, a method by which a suspension position of a supporting bar in a pallet can be detected is disclosed. The pallet is fitted with a plurality of supporting bars along a longitudinal direction for use with a flatbed machine tool, in particular a laser-cutting or plasma-cutting flatbed machine tool, each of the supporting bars having multiple supporting bar tips along a main direction of extent, which is aligned transversely to the longitudinal direction of the pallet, and the supporting bar tips of the plurality of supporting bars defining a supporting plane. The method comprises the following steps:
creating a two-dimensional contrast-image dataset of the pallet, having a plurality of image pixels, each image pixel being assigned a pixel value and a pixel-area unit of the supporting plane and the contrast-image dataset comprising regions which are assigned to the supporting bar tips as local pixel-value extremes in a uniform pixel-value background,
determining a longitudinal position in the contrast-image dataset of those regions which are assigned to the supporting bar tips of one of the plurality of supporting bars, using the local pixel-value extremes, and
deducing the suspension position of the supporting bar in the pallet on the basis of the longitudinal position in the contrast-image dataset and an extent of the pixel-area unit in the longitudinal direction.

In a further aspect, the flatbed machine tool, in particular laser-cutting or plasma-cutting flatbed machine tool, comprises:
a pallet with multiple supporting bars suspended at suspension positions, each of the supporting bars having a plurality of supporting bar tips, which define a supporting plane;
a camera for producing a two-dimensional camera image or a two-dimensional dark-field camera image of the pallet; and
an evaluation device.

The camera and/or the evaluation device are designed for:
creating a two-dimensional contrast-image dataset of the pallet, having a plurality of image pixels, each image pixel being assigned a pixel value and a pixel-area unit of the supporting plane and the contrast-image dataset comprising regions which are assigned to the supporting bar tips as local pixel-value extremes in a uniform pixel-value background, The evaluation device is also designed for:
determining a longitudinal position in the contrast-image dataset of those areas that are assigned to the supporting bar tips of one of the plurality of supporting bars, using the local pixel-value extremes, and
deducing the suspension position of the supporting bar in the pallet on the basis of the longitudinal position in the contrast-image dataset and an extent of the pixel-area unit in the longitudinal direction.

In some developments, one of the regions assigned to the supporting bar tips may be assigned to a supporting bar tip and/or to a flank leading to the supporting bar tip.

In some developments, the uniform pixel-value background may not represent a structure and/or comprise image pixels which have a constant pixel value or an arbitrary pixel-value distribution about a constant pixel value.

In some developments, the creation of the contrast-image dataset of the pallet may also comprise:
producing a two-dimensional camera image of the pallet in the visible and/or infrared spectrum, the camera image having the image pixels arranged in rows and columns, to which the pixel-area unit of the supporting plane is respectively assigned.
Fourier transforming the camera image into a frequency domain and outputting a transformation-frequency dataset,
filtering the transformation-frequency dataset to emphasize frequencies in the frequency domain that belong to the regions which are assigned to the supporting bar tips, and
transforming back the filtered transformation-frequency dataset into a back-transformed image dataset by means of inverse Fourier transformation and outputting the back-transformed image dataset as the contrast-image dataset.

In some developments, adjacent supporting bar tips in the main direction of extent may have substantially the same tip spacing from one another. Then, the filtering of the transformation-frequency dataset may comprise identifying a frequency band assigned to the tip spacing in the frequency domain and restricting the transformation-frequency dataset to the frequency band. The frequency band may for example be formed around a tip repetition frequency, which is assigned to the main direction of extent. It may in particular be obtained from: $h \cdot \Delta x / d$, where:
h: is the number of pixels of the region of the supporting plane in the main direction of extent that is represented in the camera image,
$\Delta x$: is the extent of the pixel-area unit in the main direction of extent; and
d: is the tip spacing of adjacent supporting bar tips.

In some developments, the production of the two-dimensional camera image may be performed by producing a dark-field camera image of the pallet in the near-infrared frequency spectrum and the dark-field camera image may be recorded from a recording direction which forms an angle with the supporting plane which lies in the range from 10° to 70°, in particular is greater than 45°, for example 60°, and which extends at an angle in a range from 70° to 110°, in particular perpendicularly, to the main direction of extent.

In some developments, the creation of the contrast-image dataset of the pallet may also comprise producing the contrast-image dataset by producing a dark-field camera image of the pallet in the near-infrared frequency spectrum from a recording direction which forms an angle with the supporting plane. The angle may be for example in the range from 10° to 70°, in particular greater than 45°, for example 60°. Furthermore, the recording direction may extend at an angle in a range from 70° to 110°, in particular perpendicularly, to the main direction of extent.

In some developments, the creation of the contrast-image dataset of the pallet may also comprise illuminating the pallet from above with light of a near-infrared frequency spectrum from one or more illumination directions. The light may in particular lie in the frequency spectrum from 845 nm to 855 nm and from 935 nm to 945 nm.

In some developments, at least one of the illumination directions may form an angle with the supporting plane that is less than 30° and, in particular, lies in a range from 10° to 20°, for example at around 15°, and the at least one of the illumination directions, projected into the supporting plane, may form an angle with a main direction of extent of the supporting bar which is less than 30° and, in particular, lies in a range from 10° to 25°, for example at around 15°.

In some developments, the production of the two-dimensional camera image or the production of the two-dimensional dark-field camera image may comprise recording multiple partial camera images, which in each case two-dimensionally represent a partial region of the pallet, and putting together the partial camera images to form the two-dimensional camera image or the two-dimensional dark-field camera image of the pallet.

In some developments, the determination of the longitudinal position in the contrast-image dataset may comprise:
carrying out a template-matching image analysis by using a template. The template may be formed as an image dataset of a supporting bar having a plurality of supporting bar tips, in particular a supporting bar arranged in an inner region of the pallet.

In some developments, the determination of the longitudinal position in the contrast-image dataset may comprise summating the pixel values of the image pixels of the contrast-image dataset row by row in accordance with the main direction of extent and outputting a first distribution of first pixel-value sums and determining a local extreme in the first distribution and outputting the row of the local extreme as a longitudinal position.

In some developments, the method may also comprise:
summating the pixel values of the image pixels of the contrast-image dataset column by column in accordance with the longitudinal direction in the region of the local extreme and outputting a second distribution of second pixel-value sums,
determining multiple local extremes in the second distribution and outputting the columns of the local extremes and
determining image positions of the regions in the contrast-image dataset which are assigned to the supporting bar tips on the basis of the corresponding row of the determined local extreme and the columns of the determined local extremes.

In some developments, the supporting bars may be suspendable at predetermined suspension positions on one longitudinal side of the pallet and the main direction of extent may extend transversely to the longitudinal side and the pallet may have a reference structure which is identifiable in the contrast-image dataset as a reference pixel arrangement. The deduction of the suspension position of the supporting bar in the pallet may be performed by determining a distance between the reference pixel arrangement and the longitudinal position transversely to the main direction of extent in the contrast-image dataset and, on the basis of the distance determined, identifying one of the predetermined suspension positions for the longitudinal position.

In some developments, the pixel value may be a gray value, a color value or a brightness value.

In some developments, the camera may be designed:
to produce the two-dimensional camera image of the pallet in the visible or infrared spectrum, the camera image having image pixels arranged in rows and columns to which a pixel-area unit of the supporting plane is respectively assigned, or
to produce a contrast-image dataset by recording the two-dimensional dark-field camera image of the pallet in the near-infrared frequency spectrum from a recording direction.

In some developments, the evaluation device may be designed to perform the method and/or may comprise a processor which is designed:
to Fourier transform the camera image into a frequency domain and to output a transformation-frequency dataset,
to filter the transformation-frequency dataset to emphasize frequencies in the frequency domain that belong to the regions which are assigned to the supporting bar tips and
to transform the filtered transformation-frequency dataset back by means of inverse Fourier transformation and to output the back-transformed image dataset as the contrast-image dataset.

In some developments, at least one illumination device, which is designed for illuminating the pallet with light of a near-infrared frequency spectrum from one or more illumination directions, may be provided. At least one of the illumination directions may form an angle with the supporting plane that is less than 30°, and, in particular, lies in a range from 10° to 20°, for example at around 15°. The at least one of the illumination directions, projected into the supporting plane, may form an angle with a main direction of extent of the supporting bar which is less than 30°, and in particular, lies in a range from 10° to 25°, for example at around 15°.

In some developments, the method may comprise determining individual positions of regions assigned to the individual supporting bar tips within the columns or rows assigned to the first local pixel-value sum extremes. For this purpose, a parallel-projection image analysis may be carried out for example, an analysis in which the pixel values of the image pixels of the columns or rows of the contrast-image dataset which are assigned to the first local pixel-value sum extremes, i.e., which are assigned to a supporting bar, are summed (row by row or column by column) perpendicularly to the main direction of extent of the supporting bar to form a second pixel-value sum, assigned to the respective row or line. Based on this, the rows or columns of which the assigned pixel-value sums form a second local pixel-value sum extreme can be determined.

In some developments, the determination of the longitudinal position of the regions in the contrast-image dataset which are assigned to the supporting bar tips may alternatively or additionally comprise carrying out a sliding-window-approach image analysis, in which a framework is created around a template-matching filter, or an image analysis based on a SIFT algorithm or an image analysis based on neural networks.

Concepts which allow aspects from the prior art to be at least partially improved are disclosed here. In particular, further features and their expediencies will become apparent from the following description of embodiments with reference to the figures.

Aspects described here are based partly on the realization that the detection of the suspension position of a supporting bar by image recognition, in particular image recognition directed to the detection of the image bar tips, can be performed robustly, quickly and highly accurately if a contrast-image dataset in which the supporting bar tips are emphasized and other "interfering" structures are largely suppressed or not shown is used. Interfering structures may be caused for example by a situation where there is undefined illumination, wear, slag and the state of the surface of the supporting bar. With such a low-interference contrast-image dataset, erroneous supporting-bar detections can be reduced. Furthermore, the complexity of the image analysis can be reduced.

The inventors have also realized that a contrast-image dataset can be created both by way of Fourier transformation and by way of dark-field illumination or dark-field recording. In addition, the two ways may also be combined with one another, by for example subsequently filtering a (camera) image created by means of dark-field illumination or dark-field recording by means of Fourier transformation before it is transferred into a contrast-image dataset. Such a combination of the two ways can make an ever lower-interference contrast-image dataset possible.

In both cases, first a recording of the (usually unoccupied) pallet is made with a camera and is subsequently perspectival transformed "into the bird's eye view", so that the supporting bars appear in the image longitudinally or transversely, for example as (vertical or horizontal) lines extending along the main direction of extent of the supporting bars. The recording may also be put together from multiple partial recordings of various cameras and be recorded both outside ("in front of") and inside the machine (i.e., in the production space).

In the recording to be evaluated, the supporting plane is represented without perspective distortion in the contrast-image dataset. For rectification, an originally perspectively distorted image may be processed for example by usual methods of homography. Thus, each image pixel may be assigned a pixel-area unit of the supporting plane, in particular a square-shaped pixel-area unit, of the same size for all image pixels of for example 1 mm$^2$. Rectified in this way, objects of the same size in the supporting plane can be represented in the same size in the contrast-image dataset, irrespective of the position of the individual object in the supporting plane or in the contrast-image dataset. If the extents of an image pixel in a direction of extent of the supporting bars and transversely thereto are known, the rectification can facilitate a determination of the longitudinal position of the regions assigned to the supporting bar tips (and consequently a determination of the longitudinal position of the associated supporting bar).

The concepts disclosed here are consequently based inter alia on the fact that a contrast-image dataset of a pallet in which regions which are assigned to the supporting bar tips are emphasized is used. By way of example, such high-contrast image datasets may be obtained by special imaging arrangements or methods of image analysis (or a combination of the two methods). Explained in more detail here as examples are filtering in the course of Fourier image processing and an application of dark-field imaging. Filtering by means of Fourier image processing and the application of dark-field imaging may be used here as alternatives or else be combined with one another, by for example first recording a (camera) image of the pallet by applying the dark-field imaging and then processing this image by filtering by means of Fourier image processing. Modifications of this or other approaches will be apparent from the common description of these embodiments given by way of example.

Fourier transformation is a transformation of an image dataset, common in the area of image processing, which is referred to a first reference system, the so-called image or spatial domain, into a transformation-frequency dataset, which is referred to a second reference system, the so-called frequency domain.

In the Fourier transformation, a periodically regularly occurring pattern in the spatial domain, i.e., referred to the geometry of the pallet, is assigned a frequency in the frequency domain of the transformation-image dataset. Patterns occurring periodically regularly in the spatial domain along the directions in which the pixels are arranged in rows are represented in the representation of the transformation-frequency dataset in an amplitude spectrum as horizontal or vertical (frequency) lines, and are consequently easily detectable. The supporting bar tips also form a repetition pattern in the image dataset along a main direction of extent of the supporting bar and can consequently be assigned frequencies in the transformation-frequency dataset. These frequencies are also represented in the amplitude spectrum as lines (presupposing a corresponding alignment of the supporting bars).

Filtering of the transformation-frequency dataset allows the frequencies assigned to the supporting bar tips to be emphasized and, by contrast, the other frequencies to be (relatively) diminished or even removed. Subsequent transforming back of the filtered transformation-frequency dataset allows an image dataset (referred to the image domain), in which the supporting bar tips are emphasized with high contrast, to be output. By contrast, "interfering" structures or textures that are not clearly assigned to the supporting bars are at least diminished, so that in other words the regions of the supporting bar tips can be represented as local pixel-value extremes in a uniform pixel-value background within a contrast-image dataset of the pallet.

A local pixel-value extreme may in this case be a group of adjacent image pixels or individual image pixels. If the local pixel-value extreme is formed as a group of adjacent image pixels, the image pixels belonging to the group consequently have in each case much higher pixel values than those image pixels which surround the image-pixel group of the local pixel-value extreme and form the uniform pixel-value background. The pixel value may be for example a gray value, a low gray value corresponding to a dark image pixel, a high gray value corresponding to a bright (illuminated) image pixel.

A contrast-image dataset of the pallet may also be obtained by the method of dark-field illumination or dark-field recording (dark-field strategy). Dark-field strategies are used for example in automatic visual inspection. Dark-field strategies use a dark-field illumination device and a dark-field camera recording a dark-field image. The illumination is performed at an (often very shallow) angle, whereas the recording may be performed at a different (steep) angle. The majority of the light emitted by the dark-field illumination device is not reflected to the dark field camera. In the visual inspection referred to, only defects in the surface scatter/reflect, whereas in the present case of recording a pallet with supporting bars only the supporting bar tips and the flank leading to the supporting bar tips scatter/reflect light into the dark-field camera. A largely dark-field image (referred to here as the uniform pixel-value background) is produced as a result, by only the supporting bar tips and flanks appearing much brighter than their surroundings (referred to here as local pixel-value extremes). Such a dark-field image is a further example of a contrast-image dataset of the pallet in which the regions assigned to the supporting bar tips are represented as local pixel-value extremes in a uniform pixel-value background.

The use of light of a near-infrared frequency spectrum for the (dark-field) illumination also allows extraneous light effects due to sunlight or artificial illumination to be reliably suppressed without an enclosure. Extraneous light effects due to sunlight can in this case be suppressed in particular by using near-infrared light in the frequency range from 845 nm to 855 nm and/or from 935 nm to 945 nm for the illumination, since this corresponds to the band gaps in the spectrum of the sunlight on the Earth's surface. The recording of a dark-field camera image of the pallet in the near-infrared frequency spectrum, in particular in the frequency spectrum mentioned, can be realized in particular by the use of a corresponding spectral filter.

The determination of the suspension position is based on an analysis of the contrast-image dataset. Various methods of analysis are disclosed by way of example here.

Template-matching image analysis is a method for detecting objects in an image dataset that is based on a two-stage approach. First, a template of the object to be detected is created, then the occurrence of the template in an image dataset is assessed with the aid of a measure of similarity, for example the sum of the absolute differences. Template-matching image analysis is described in detail for example in G. Cheng and J. Han, "A survey on object detection in optical remote sensing images," ISPRS Journal of Photogrammetry and Remote Sensing, vol. 117, pp. 11-28, 2016.

The template, which may be formed as an image dataset of a supporting bar, can in this case be produced in particular by recording a camera image or a dark-field camera image in the near-infrared frequency spectrum of an as-new (not worn or slag-affected) supporting bar.

Since, owing to perspective effects, the representation of the supporting bar can change, dependent on its suspension position along a longitudinal extent of the pallet, a supporting bar which has been suspended in the inner region of the longitudinal extent of the pallet may be selected as the template. Such a template may be used both for the detection of supporting bars suspended further "to the front" and also further "to the rear".

Parallel-projection image analysis is also a method for detecting objects which extend over a certain portion of a row or a column of an image dataset. In particular in the parallel-projection image analysis, supporting bars (of which the main direction of extent extends along an image-pixel line or an image-pixel row) can be identified in the image very easily and quickly, by the gray values of the image pixels being added line by line (or column by column). Supporting bars form a maximum in this "signal distribution" produced by projection/summation of the pixel values along the supporting bars. Parallel-projection image analysis is described for example in P. Du, et al., "Improved peak detection in mass spectrum by incorporating continuous wavelet transform-based pattern matching," Bioinformatics, vol. 22, no. 17, pp. 2059-2065, 2006.

Further methods for the image analysis of the contrast-image dataset comprise a sliding-window-approach image analysis (see for example M. Barva, et al., "Parallel integral projection transform for straight electrode localization in 3-D ultrasound images," IEEE transactions on ultrasonics, ferroelectrics, and frequency control, vol. 55, no. 7, pp. 1559-1569, 2008), s SIFT-algorithm-based image analysis (see for example D. G. Lowe, "Object recognition from local scale-invariant features." in IEEE International Conference on Computer Vision, vol. 99, no. 2, 1999, pp. 1150-1157) and an image analysis based on neural networks (see for example D. Erhan, et al., "Scalable object detection using deep neural networks," in IEEE Conference on Computer Vision and Pattern Recognition, 2014, pp. 2147-2154 and K. He, et al., "Mask r-cnn," in Proceedings of the IEEE International Conference on Computer Vision, 2017, pp. 2961-2969).

Generally, false identifications can be caused by for example strongly reflecting edges on the supporting bars or by cutting burrs. In order to subsequently rule out such false identifications, detected supporting-bar candidates may be checked. For example, it may be checked how much the gray values of the image portion assigned to the supporting-bar candidate fluctuate in the direction of the supporting bar tips. If the fluctuation lies above a threshold value to be fixed, an erroneously identified supporting-bar candidate can be assumed and it can be excluded. In this way, false identifications can be advantageously avoided quickly and easily when using parallel-projection image analysis.

An installation with a flatbed machine tool is described below with reference to FIG. 1. FIG. 2 summarizes this steps of a method for detecting a suspension position in a flow diagram. The production of a contrast-image dataset by means of filtered Fourier transformation is explained on the basis of FIGS. 3 to 6. The production of a contrast-image dataset by a dark-field approach is explained on the basis of FIGS. 7 and 8. FIG. 9 illustrates a template for image analysis.

Figure 2:
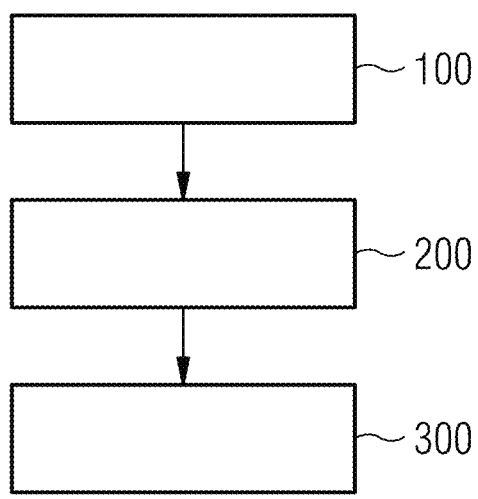
FIG. 2 shows a flow diagram for explaining the method for detecting a suspension position of a supporting bar in a pallet.

FIG. 1 shows a flatbed machine tool 1 with a pallet 3, a camera 5, illumination devices 7, 7' (shown by dashed lines) and an evaluation device (evaluator) 11 comprising a processor 9 and connected to the camera 5.

Supporting bars 13 may be suspended along one longitudinal side 3a of the pallet 3 (which defines the longitudinal extent) in a frame 4 of the pallet 3 in multiple, discrete suspension positions 15, suspension including here any kind of fixed arrangement and optionally fastening. In some suspension positions 15, no suspension bars 13 have been suspended in the example of the pallet of FIG. 1. It is evident that the suspension bars 13 are fitted closer together near the machine tool than at the remote end side 3b of the pallet.

The supporting bars 13 extend along a common main direction of extent 13a (in FIG. 1 along end sides 3b of the pallet 3), are in each case configured in the form of a plate and have a plurality of supporting bar tips 17. The supporting bar tips 17 form/define a common supporting plane 17a. In the main direction of extent 13a, successive/adjacent supporting bar tips 17 are arranged apart from one another in each case with the tip spacing 17b. Usually, the tip spacing 17b is substantially the same for all supporting bars 13.

A material panel, which is intended for machining by the flatbed machine tool 1, can be mounted on the supporting bars 13 in the supporting plane 17a. In this case, the supporting bar tips 17 are in contact with the material panel, so that for example during the machining of the material the laser beam can also interact with the supporting bar tips 17. In order that the positions of the supporting bars 13 can be taken into account, for example already in the arrangement of workpieces to be cut in the material panel, preferably automated detection of the positions of the supporting bars 13 is desirable.

In order to ensure correct positioning of the material panel, the pallet 3 has a stop 19 arranged on the frame 4 and schematically represented in FIG. 1. The design of the stop 19 allows it to be used as an optically detectable reference structure 19a in the image processing.

Figure 3:
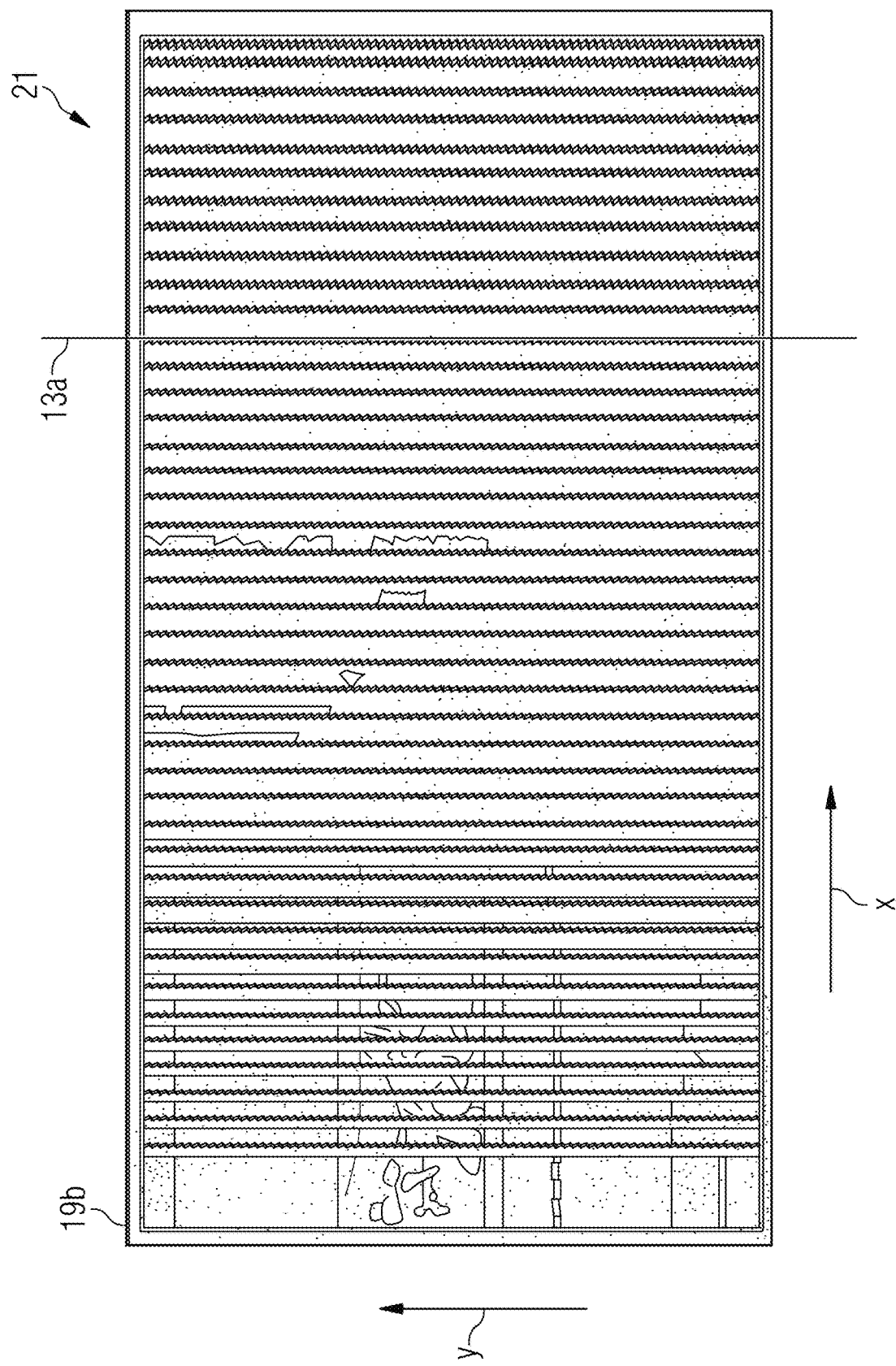
FIG. 3 shows a rectified camera image of a pallet given by way of example (bird's eye view)
Figure 7:
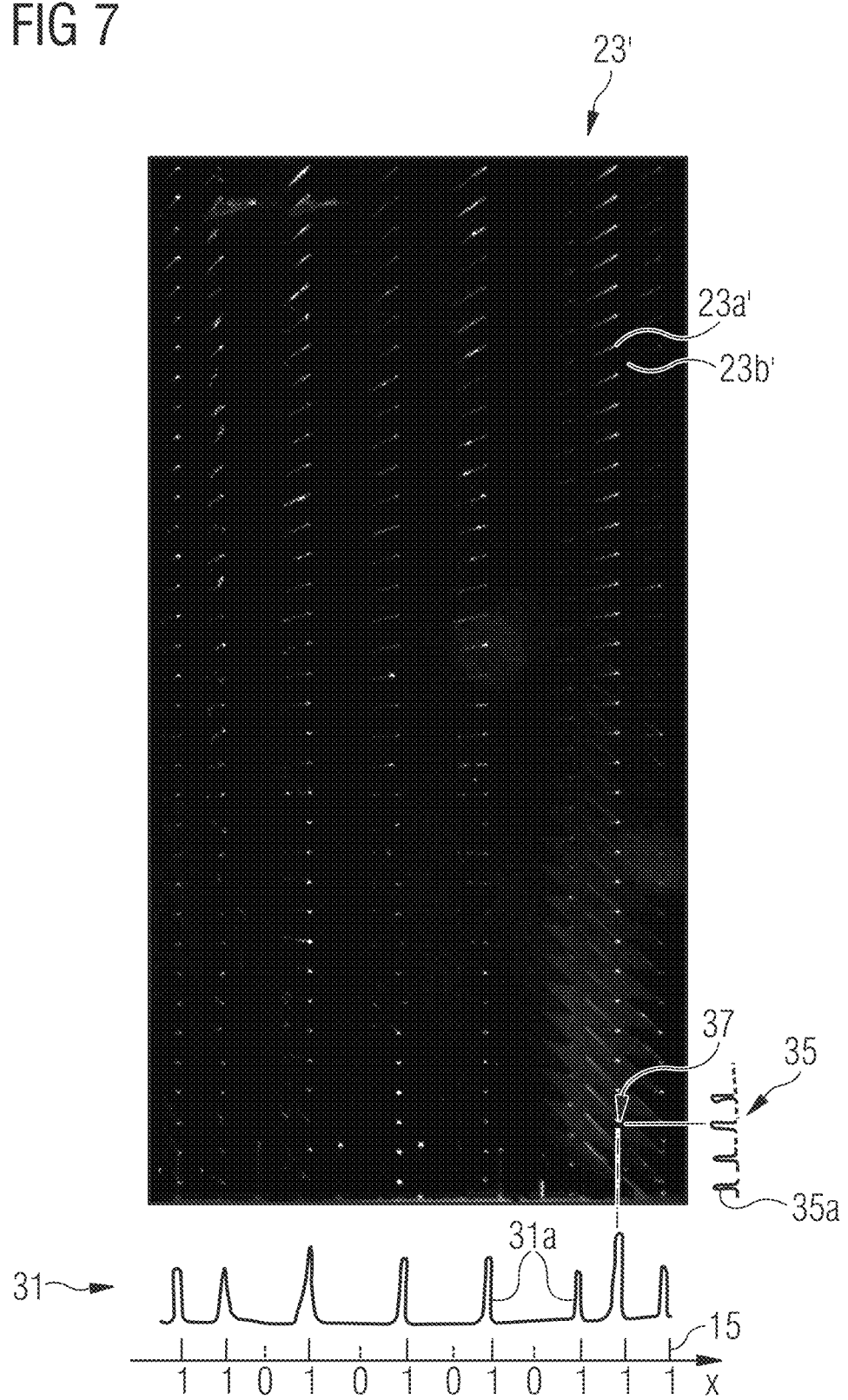
FIG. 7 shows a contrast-image dataset produced by means of dark-field illumination and given by way of example.

The camera 5 is connected for example by a camera arm 5' to a production housing of the flatbed machine tool 1. By means of the camera 5, a two-dimensional, in particular monochrome or color, camera image of the pallet 3 can be produced in the visible or infrared spectrum (see image dataset 21 FIG. 3) or a dark-field camera image of the pallet 3 can be produced in the near-infrared frequency spectrum (see contrast-image dataset 23' FIG. 7). The recording of the respective image is performed from a recording direction 5a toward the pallet 3 from laterally above. On account of the oblique recording direction 5a, an optical or digital rectification of the camera image may be performed for easy image processing. The images shown in FIGS. 3 and 7 are correspondingly rectified camera images. As already mentioned, such a "rectified" camera image of the supporting plane 17a may be provided for example by the method of homography.

The (common) main direction of extent 13a of the imaged supporting bars 13 and the longitudinal direction, running transversely thereto, of the imaged pallet 3 may in this case also be used with reference to the image dataset 21, the contrast-image dataset (23) and the dark-field camera image or the contrast-image dataset (23') for corresponding image-based or image-dataset-based directional indications.

The camera image and the dark-field camera image have image pixels arranged in rows and columns, to which in each case a pixel value and a usually square pixel-area unit of the supporting plane of the same size are assigned. The pixel value is a gray value, a low gray value corresponding to a dark pixel, a high gray value corresponding to a bright pixel. For the aspects discussed here, a color resolution is not necessary, since the image analysis relates primarily to intensity values.

The recording direction 5a forms an angle 5b with the supporting plane 17a. In the case given by way of example in FIG. 1, the recording direction 5a runs perpendicularly to the main direction of extent 13a of the supporting bars 13. The angle 5b lies for example in the range from 10° to 70°, in particular it may be greater than 45°, for example at 60°. Deviations from the perpendicular alignment with respect to the main direction of extent are for example around ±20°.

By means of the illumination device 7 (represented by dashed lines), the pallet 3 can optionally be additionally illuminated with infrared light, for example with light in the near-infrared frequency spectrum from 845 nm to 855 nm and/or 935 nm to 945 nm, in an illumination direction 7a. The illumination direction 7a forms an angle 7b with the supporting plane 17a. The angle 7b is for example less than 30° and lies in particular in a range from 10° to 20°, for example at around 15°. The illumination device 7 illuminates the supporting bars 13 from "behind", that is to say shines on the rear sides of the supporting bars 13 with respect to the camera 5. Correspondingly, the illumination direction 7a projected into the supporting plane 17a (perpendicularly to supporting plane 17a) forms an angle 7c with the main direction of extent 13a of the supporting bars 13. The angle 7c is for example less than 30° and lies in particular in a range from 10° to 25°, for example at around 15°.

Further illumination directions may be provided by further illumination devices; for example, an additional illumination device 7' is shown in FIG. 1. Multiple illumination devices allow the supporting bars to be illuminated more evenly. It must be considered here that an illumination device should not shine directly onto the camera in order to avoid oversaturation of the camera ("dazzling of the camera"). In addition, the camera 5 may be used in combination with a frequency filter, which transmits a specifically selected spectral range.

The flatbed machine tool 1 is designed to make possible a method for detecting the suspension position 15 of the supporting bars 13. The calculations necessary for this for the image processing may be carried out for example with the processor 9 of the evaluation device 11. Correspondingly, the camera 5 and optionally the illumination device 7 are connected to the processor 9/the evaluation device 11 for receiving data (image datasets) and for activating the same (triggering the image recording or the illumination). The evaluation device 11 may be formed as a PC, computing node or similar suitable hardware and in particular as part of the control unit which carries out the activation of the flatbed machine tool 1. The evaluation device 11 may consequently be formed as part of a higher-level or local control system of the flatbed machine tool or as a unit of its own. The evaluation device 11 is designed in particular to carry out/keep a check on the method for determining the suspension positions during real-time operation of the flatbed machine tool 1. For this purpose, the computing system used as a basis has for example microprocessor circuits having digital processor systems with data inputs and control outputs and also databases which are operated according to computer-readable instructions stored on a computer-readable medium. The instructions comprise for example computer routines for Fourier transformations, filterings and image analyses. The evaluation device 11 can provide high computing power for real-time support. It can also provide a long-term (nonvolatile) memory for storing program instructions and a very fast short-term (volatile) memory for (buffer) storing acquired data and datasets produced while carrying out the method.

The method for detecting the suspension position 15 of the supporting bar concerns a pallet 3, which as described above is fitted with a plurality of supporting bars 13 along a longitudinal direction of the pallet 3. Each of the supporting bars 13 has multiple supporting bar tips 17 along the main direction of extent 13a, which is aligned transversely to the longitudinal direction. The supporting bar tips 17 define the supporting plane 17a. As shown in FIG. 2, the method comprises the following steps, which can be implemented at least partly as a computer-implemented method.

In a step 100, a two-dimensional contrast-image dataset of the pallet 3, having a plurality of image pixels, is created. In this case, each image pixel is assigned a pixel value and a pixel-area unit of the supporting plane 17a and the contrast-image dataset comprises regions which are assigned to the supporting bar tips 17, as local pixel-value extremes in a uniform pixel-value background.

In a step 200, a longitudinal position of those regions which are assigned to the supporting bar tips 17 of one of the plurality of supporting bars 13 in the contrast-image dataset is determined on the basis of the local pixel-value extremes.

In a step 300, the suspension position 15 of the supporting bar 13 in the pallet 3 is deduced on the basis of the longitudinal position in the contrast-image dataset and an extent of the pixel-area unit in the longitudinal direction.

Two approaches by which a contrast-image dataset can be created are described below by way of example (cf. step 100).

First it is explained in connection with FIGS. 3 to 6 how the creation of a contrast-image dataset 23 is performed by means of Fourier transformation. Following that, creation by means of dark-field illumination and dark-field recording is explained on the basis of FIGS. 7 and 8. Advantages of Fourier transformation are the flexible application and incorporation in existing recording systems, since often already available image data can be used. By contrast with this computationally intensive implementation, the dark-field approach substantially requires an independent camera system with optionally its own illumination. On the other hand, data processing in the case of the dark-field approach is greatly simplified. A common aim of the approaches here is the provision of a contrast-image dataset in which the supporting bar tips 17 are emphasized as much as possible, represented in the examples as "brightest possible regions" in an otherwise blackest possible image (or in an arbitrary pixel-value distribution about a constant pixel value).

Both approaches proceed from an image of the pallet when it is stationary in the machine tool or on the pallet changer. The pallet is also preferably as completely empty as possible. The starting image is perspectively transformed, so that the supporting bars appear similar to lines in one of the directions in which the pixels are arranged in rows (vertically or horizontally in the image). The starting image may also be put together from multiple camera images.

FIG. 3 shows a two-dimensional camera image 21 of the pallet, produced by the camera 5 in the visible spectrum, with multiple supporting bars along the main direction of extent 13a, which in FIG. 1 corresponds to the y direction. Also evident to some extent are regions of the pallet frame of which the longitudinal sides 3a extend in a longitudinal direction (identified according to FIG. 1 as the x direction) and of which the end sides 3b extend along the main direction of extent 13a.

The camera image 21 has a plurality of image pixels, to which a gray value is assigned in each case. The camera image 21 was recorded obliquely from above, so that, with increasing distance of the supporting bars from the camera 5, not only the upper edge, but increasingly also the side faces of the supporting bars that are facing the camera can be seen in the camera image 21. In other words, for perspective reasons, the individual supporting bars 13 are represented differently in the camera image 21, dependent on their position in the supporting plane 17a, in particular the suspension position in the longitudinal direction: Because of the relatively steep recording angle, the supporting bars in the left-hand edge region of the camera image 21 appear almost in plan view and consequently appear like lines (only the upper side is perceived). Because of the relatively shallow recording angle, the supporting bars in the right-hand edge region of the camera image 21 appear in a kind of oblique view, whereby their plate-shaped side faces are perceived.

Since, however, the camera image 21 has been rectified, for example by means of the aforementioned method of homography, each image pixel is assigned a square pixel-area unit of the supporting plane 17a of the same size, so that the camera image 21 in this respect corresponds to a distortion-free plan view (bird's eye view), even if the image content deviates from this on account of the oblique recording direction.

Furthermore, the reference structure 19a shown in FIG. 1 is evident in the camera image 21 as a reference pixel arrangement 19b. The reference pixel arrangement 19b can be identified by means of methods of image analysis (for example template-matching image analysis, see below).

Owing to the illumination situation, the supporting plane 17a may be illuminated unevenly, which is manifested by some regions of the supporting bars 13 appearing much brighter than others. Generally, a greatly structured gray-value distribution can be seen in the camera image 21.

Furthermore, the individual supporting bars 13 may be in varying states with respect to wear, slag and the state of the surface. For instance, individual supporting bar tips may be (incipiently) melted and/or deformed.

In the course of the image processing, the processor 9 Fourier transforms the camera image 21 of FIG. 3, referred to a spatial domain, into a transformation-frequency dataset 21a, referred to a frequency domain.

Figure 4:
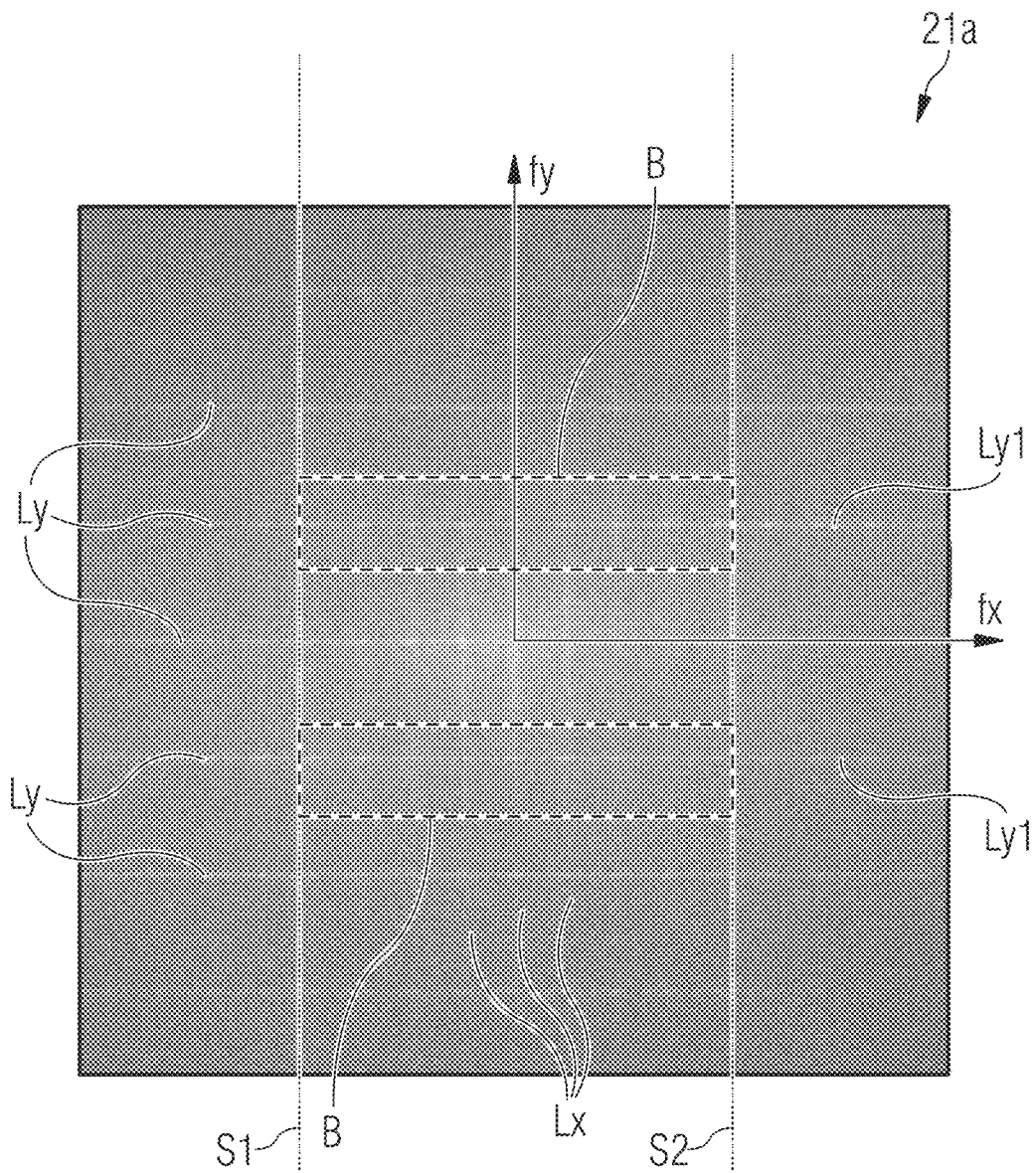
FIG. 4 shows a representation of an amplitude spectrum of a transformation-frequency dataset of the camera image referred to a frequency domain.

FIG. 4 shows the transformation-frequency dataset 21a in a so-called amplitude-frequency representation, in which the brightness of an individual image point represents a measure of the amount of the amplitude (square of the absolute value) of the respective frequency. The frequency axes (fx axis and fy axis) represent the spatial frequencies in the two orthogonal directions of analysis (x direction, y direction). In FIG. 4, the two frequency axes fx, fy have their origin at the center in each case (origin of coordinates).

Owing to the nature of the Fourier transformation and the regular periodic arrangement of the supporting bar tips 17 and the supporting bars 13 in relation to one another, distinct brighter regions with local brightness extremes (peaks) are visible in the square of the absolute value of the amplitude. For example, "horizontal" lines have been marked Lx in the fx direction and vertical lines have been marked Ly in the fy direction in FIG. 4. These brighter regions are attributable to the geometry of the supporting bars 13, in particular to the recurring structure of the supporting bar tips 17 in the main direction of extent 13a and/or to the regularity of the suspension positions 15 in the longitudinal direction.

Taking into account the possible geometry of the fitted supporting bars of the pallet, for example a binary filtering of the transformation-frequency dataset 21a may be performed.

The supporting bar tips 17, spaced apart from one another with the tip spacing 17b, form in the camera image 21 (in the spatial domain) a periodic, regularly recurring pattern extending in accordance with the main direction of extent 13a. This may be assigned in the transformation-frequency dataset 21a a tip repetition frequency (a spatial frequency in the y direction). The tip repetition frequency is in this case represented in FIG. 4 by the two horizontal lines Ly1 closest to the origin of the coordinates and at an equal distance from it. The tip repetition frequency is obtained from:

$h * \Delta x / d$, where:

h: is the number of pixels of the region of the supporting plane 17a in the main direction of extent 13a that is represented in the camera image 21, $\Delta x$: is the extent of the pixel-area unit in the main direction of extent 13a and d: is the tip spacing 17b of adjacent supporting bar tips 17.

Values by way of example are: Δx=1 mm, for example h=1600 image pixels and d=16 mm, so that a tip repetition frequency of 100 image pixels is obtained.

To emphasize the tip repetition frequency, the transformation-frequency dataset 21a may be filtered, i.e., the transformation-frequency dataset 21a is restricted to a frequency band. A filtered transformation-frequency dataset extends for example in a fixed frequency bandwidth around the tip repetition frequency. In FIG. 4, two frequency bands along the lines Ly1 are selected by way of example.

The inventors have also realized in this connection that the downstream determination (step 200 in FIG. 2) of the position of the regions in the contrast-image dataset which are assigned to the supporting bar tips can be performed quickly and reliably if high-frequency, fx-spatial frequencies, the amplitude contribution of which can be ignored (illustrated in FIG. 4 as the frequencies to the left and right of the dashed lines S1, S2), are removed from the transformation-frequency dataset 21a.

The transformation-frequency dataset 21a filtered and restricted in this way only comprises for example the amplitude values in the rectangles B, for example by the amplitude contributions of the remaining frequencies being set to zero. In a representation analogous to FIG. 4, the regions outside the rectangles B would correspondingly be represented in black.

Subsequently, the processor 9 transforms the filtered transformation-frequency dataset 21a by means of inverse Fourier transformation back into the spatial domain.

The fact that the transformation-frequency dataset 21a has been restricted to the frequency band around the tip repetition frequency, and consequently all frequencies outside the frequency band are suppressed (filtered), means that a contrast-image dataset 23 (referred to the image domain) can be produced (see FIG. 5) by the subsequent back transformation of the filtered transformation-frequency dataset 21a. In the contrast-image dataset 23, the supporting bar tips 17 are emphasized and other "interfering" structures or textures are at least substantially suppressed. The contrast-image dataset 23 correspondingly represents the regions of the supporting bar tips 17 as local pixel-value extremes 23a in a uniform pixel-value background 23b. A back-transformed image dataset, which can be output as the contrast-image dataset 23 for further image analysis, is therefore obtained.

Figure 5:
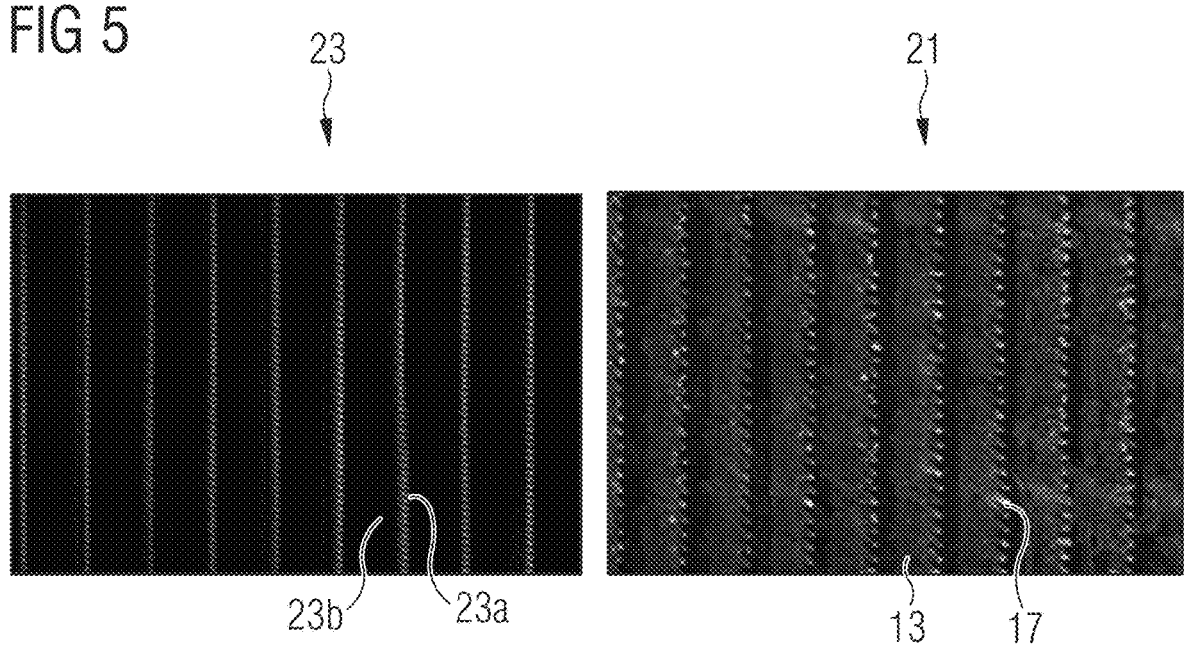
FIG. 5 shows, placed alongside one another, extracts of a contrast-image dataset produced by means of filtered Fourier transformation and given by way of example, and the associated camera image of a pallet.

FIG. 5 illustrates this "interference-reducing" effect, by showing, alongside one another, an extract (right side of the figure) from the two-dimensional camera image 21 of the pallet according to FIG. 3 and an extract (left side of the figure) of the contrast-image dataset 23 produced from it by means of Fourier transformation. Multiple well-structured linear rows of bright regions, which correspond to the supporting bar tips respectively of a supporting bar, can be seen. It is noted that, in the extract represented, the rows run equally spaced apart from one another (i.e., each suspension position has been used).

Figure 6:
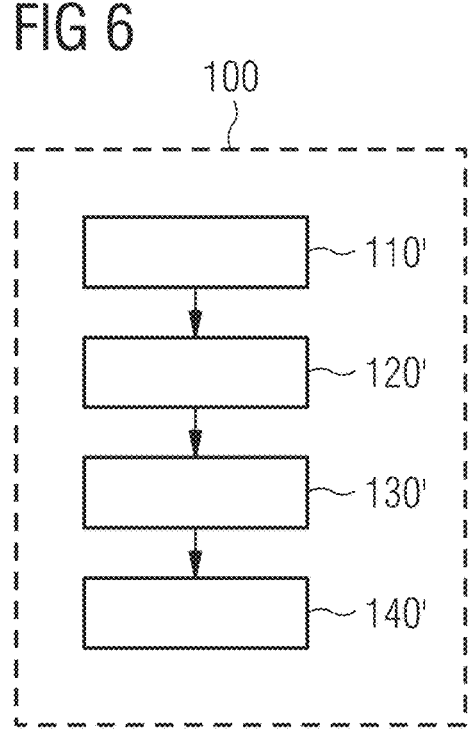
FIG. 6 shows a flow diagram to explain the calculation of the contrast-image dataset of the pallet by means of Fourier transformation and filtering in the frequency domain.

FIG. 6 illustrates the step 100 of creating the contrast-image dataset 23 by means of Fourier transformation. The image processing taken as a basis comprises the following steps, which can be implemented at least partly as a computer-implemented method:

In a step 110', a two-dimensional camera image 21 of the pallet 3 is recorded. Part of the recording process is a rectification, which is performed in such a way that the image pixels of the camera image 21, which are arranged in rows and columns, are in each case assigned the same pixel-area unit of the supporting plane 17a. The rectification may for example be calculated with the aid of the processor 9 of the evaluation device 11 on the basis of the image data of the initial image or be at least partially optically performed.

In a step 120', the camera image 21 is Fourier transformed into a frequency domain and output as a transformation-frequency dataset 21a.

In a step 130', the transformation-frequency dataset 21a is filtered to emphasize frequencies in the frequency domain that belong to the regions which are assigned to the supporting bar tips 17.

In a step 140', a Fourier back transformation of the filtered transformation-frequency dataset 21a is performed by means of inverse Fourier transformation, so that a back-transformed image dataset can be output as the contrast-image dataset 23.

In the second approach explained below, a contrast-image dataset is created by means of a dark-field recording, optionally with dark-field illumination. For this, as shown in FIG. 1, the pallet 3 may be illuminated by one or more illumination devices 7, 7' with light of the near-infrared frequency spectrum from the illumination direction 7a.

The implementation of the dark-field approach (dark-field strategy) for creating a contrast-image dataset of the pallet 3 may take into account that the space above the pallet 3 should be available for loading and unloading processes. For example, as shown in FIG. 1, the camera 5 may be attached by way of a camera arm 5' to a rear wall of the flatbed machine tool 1.

The illumination device 7 can then illuminate the supporting bar tips 17 laterally and from above, in order that reflected and scattered light is deflected upward to the camera 5. Furthermore, the illumination device 7 should not be directed onto the pallet at too steep an angle from above, since otherwise objects (for example material offcuts) located under the pallet 3 could be illuminated and become part of the image. Furthermore, the illumination device 7 should not illuminate the side faces of the supporting bars 13 that are facing the camera 5. The illumination device 7 may preferably illuminate laterally at a shallow angle from above and from behind (i.e., from the side opposite from the camera 5). The illumination device 7 may for example be positioned at a distance of 40 cm from the pallet. For an illumination device 7, the dark-field illumination is incident at a shallower angle on supporting bar tips 13 lying further away from the illumination device 7.

It is also noted that sometimes strong lens flares ("dazzling of the camera") can occur if light can pass directly from the illumination device 7 into the camera 5. This may be the case if the illumination device 7 is on the side of the pallet 3 opposite from the camera 5. In order to avoid this, the illumination device 7 may be provided with corresponding coverings. As mentioned, for the entire supporting plane of the pallet 3 to be illuminated evenly, multiple illumination devices 7, 7' may be provided.

FIG. 7 shows by way of example a result of the dark-field recording in the form of a dark-field camera image of the pallet 3 which was recorded in the near-infrared frequency spectrum from the recording direction 5a by means of the camera 5. The dark-field camera image may be used directly (after rectification) as the contrast-image dataset 23' for the further image analysis. Alternatively, it would also be possible to filter the dark-field camera image according to the method described further above, using a Fourier transformation, and only to use the filtered and back-transformed image dataset as the contrast-image dataset as the basis for steps 200 and 300.

In the example shown, the camera 5 has been provided with a narrow-band filter with a maximum transmittance of over 90% in the near-infrared frequency spectrum. As evident in FIG. 7, (substantially) only the supporting bar tips 17 and some of the flanks leading to the supporting bar tips 17 can be seen in the contrast-image dataset 23' as bright regions in an image which is otherwise to the greatest extent black.

Figure 8:
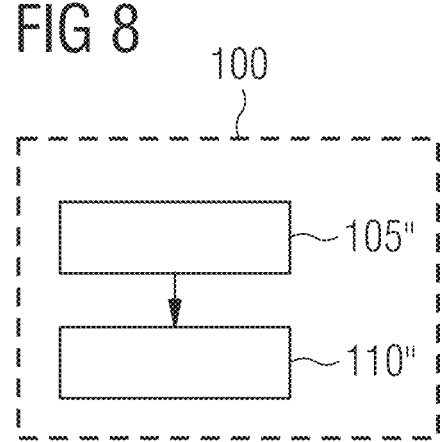
FIG. 8 shows a flow diagram to explain the imaging of a contrast-image dataset of the pallet by means of dark-field illumination and dark-field recording.
Figure 9:
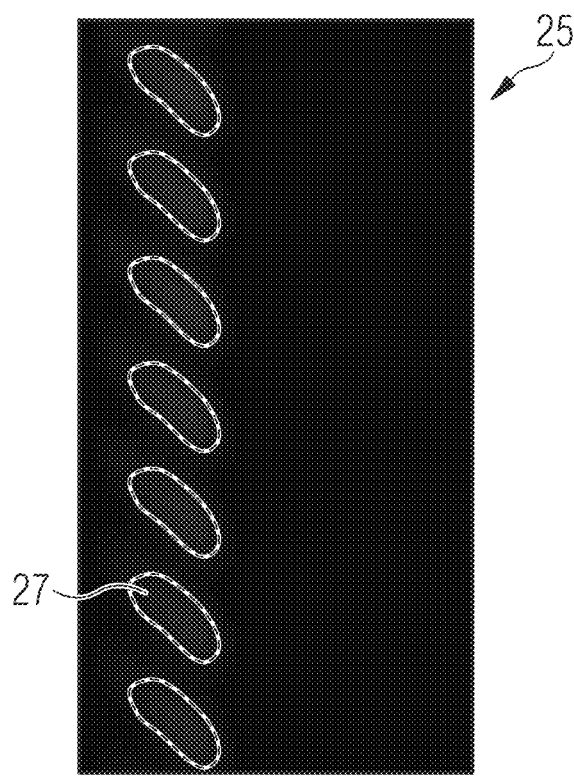
FIG. 9 shows an extract from a template, given by way of example, for a template image analysis.

The flow diagram of FIG. 8 illustrates the step 100 of creating the contrast-image dataset by means of a dark-field camera image. The image recording taken as a basis comprises the following steps, which can be implemented at least partly as a computer-implemented method:

In a step 105'' (optional), the pallet 3 is illuminated from above with light of a near-infrared frequency spectrum, in particular in the frequency spectrum from 845 nm to 855 nm and/or from 935 nm to 945 nm, from one or more illumination directions 7a. At least one of the illumination directions 7a may be at the angles 7a, 7b indicated above to the supporting plane.

In a step 110'', the contrast-image dataset 23' is produced by producing a dark-field camera image of the pallet 3 in the near-infrared frequency spectrum from a recording direction 5a. The dark-field recording may be performed at the angles 5a, 5b indicated above to the supporting plane and the main direction of extent.

In a preferred embodiment, a flatbed machine tool may be equipped with near-infrared (NIR) illumination for a pallet to be used for machining and also with a camera with a narrow-band filter. With the narrow-band filter, the influence of ambient light can be prevented. If the camera is installed on the housing of the flatbed machine tool and the illumination is installed along the longitudinal extent of the pallet such that the supporting bars are illuminated obliquely from behind, this produces a dark-field recording in which the tips and flanks of the supporting bars are represented as bright and the rest of the image is dark.

Once the contrast-image dataset 23, 23' has been created, the determination of the positions of the regions assigned to the supporting bar tips 17 in the contrast image dataset 23, 23' is performed by means of an image analysis. This may take place for example with the aid of a parallel projection for the image analysis of the contrast-image dataset 23, 23' or by a template-matching image analysis. Other more complex methods of image analysis, such as a sliding-window-approach image analysis, a SIFT-algorithm-based image analysis or an image analysis based on neural networks may likewise be used.

The result of a parallel projection along the main direction of extent 13a is schematically indicated in FIG. 7 at the lower edge of the image. By summating the pixel values in the y direction (the gray values of the image are added column by column in the direction of the main direction of extent 13a), an intensity profile 31 is obtained in the x direction, i.e., along the longitudinal extent of the pallet 3. A plurality of maxima 31a can be seen in the intensity profile.

Strongly reflecting edges on the supporting bars or cutting burr may lead to false identifications. These can be detected for example by it being checked for a candidate (a corresponding region of the intensity profile 31) how much the gray values fluctuate in the main direction of extent 13a. For example, the gray values in a region of the x axis around the candidate (for example in a region of +/−20 image pixels around a maximum) along the x axis may be added together (parallel projection transverse to the main direction of extent).

Alternatively or additionally, in order to classify a candidate quickly as a false identification, the average of the gray-value fluctuations along the y axis may be calculated. If this average is below a previously fixed threshold value, it is a false identification.

In FIG. 7, it has additionally been illustrated that the supporting bars can be suspended equally spaced apart. If one of the suspension positions 15 coincides with an intensity maximum in the intensity profile, the corresponding suspension position is marked by a "1" (suspension position occupied). If there is no intensity maximum at a suspension position 15, it has been marked by a "0" (no supporting bar 13 suspended). It can be seen in the case of FIG. 7 that not every suspension position 15 has been used, i.e., not every suspension position 15 has been fitted with a supporting bar 13.

A similar intensity profile of a parallel projection transversely to the main direction of extent 13a, which is restricted to a narrower region around the supporting bar tips (for example +/−4 image pixels), may also be used to identify individual supporting tips in the y direction. For this, again the maxima of the signal (sum of the gray values) may be determined.

This is likewise indicated in FIG. 7. For a supporting bar 13, a parallel projection in the x direction is performed, in order to detect the exact position of a suspension bar tip 17. A corresponding intensity profile 35 in the y direction has been shown with several maxima 35a in FIG. 7. The x position of the suspension position (of a maximum 31a) and the y position of one of the maxima 35a in the intensity profile 35 are used to obtain the two-dimensional position of an associated supporting bar tip 17. A supporting bar tip 37 is indicated by way of example on the basis of the x position and the y position in FIG. 7. These positions of the supporting bar tips 17 may for example be taken as a basis for the cutting process, by the planned arrangement of workpieces to be cut taking into account the positions of the supporting bar tips 17.

The parallel projection approach presented in connection with the dark-field camera image can be applied analogously to the image dataset 23.

FIG. 9 shows a template 25 for a template-matching image analysis. The template 25 shows regions 27 with slightly elevated pixel values, which in the template belong to the supporting tips and optionally to flanks leading to the supporting bar tips. Usually, a template can be extracted from a plurality of images. The template 25 may for example be obtained from an image dataset of a supporting bar 13 having a plurality of supporting bar tips 17. For example, it may be obtained from an inner region of the pallet 3, since the supporting bars 13 arranged there can be considered as it were as an average value for all the supporting bars 13. The template 25 may also be created with the aid of Fourier forward transformation and Fourier back transformation, optionally with corresponding filtering.

As also shown in FIG. 9, a template may for example be used asymmetrically with regard to the regions 27, in order to take into account existing structural information and prevent erroneous detection of a "bar dip" as a "bar tip". The latter is the case in particular whenever the supporting bar is seen laterally in the initial image, i.e., does not form a line. An asymmetrical template may then be chosen such that a region without a Fourier bandpass filter response is required alongside the detected signal. In the case of a bar dip, the tips would be visible there, so that only the supporting bar tips produce a high level of coincidence with the template 25.

In the template-matching image analysis, the determination of the positions of the regions assigned to the supporting bar tips 17 in the contrast-image dataset 23, 23' comprises carrying out a matching operation using the template 25 with regard to portions of comparable size of the contrast-image dataset 23, 23'. The x positions of the template that lead to high levels of coincidence with the contrast-image dataset 23, 23' are primarily obtained as the result of the positional determination with the template 25. These positions then correspond to the suspension positions 15 of the supporting bars 13. Depending on the quality of the template and the degree of contrast of the template 25 and the contrast-image dataset 23, 23', the respective positions of the supporting bar tips 17 along the main direction of extent 13a can also be detected.

Also, in the template-matching image analysis, the assignment of the contrast-image dataset 23, 23' to the actual position of the possible suspension positions 15 in the pallet 3 can also be included for the determination of the suspension positions 15, as already explained in connection with FIG. 7 with regard to the suspension positions 15.

Once the positions of the regions in the contrast-image dataset 23, 23' which are assigned to the supporting bar tips 17 have been determined on the basis of the local pixel-value extremes 23a (step 200), the corresponding suspension positions 15 of the supporting bars 13 in the pallet 3 can be deduced on the basis of the positions of the regions in the contrast-image dataset 23, 23' which are assigned to the supporting bar tips 17 and the pixel-area unit (step 300).

This can be performed for example for a supporting bar 13 by first determining in the contrast-image dataset 23 the number of image pixels between the reference pixel arrangement 19b (see FIG. 3) and an x position of the regions assigned to the supporting bar tips 17 of the supporting bar 13 transversely to the main direction of extent 13a. Subsequently, a corresponding distance between the reference structure 19a (assigned to the reference pixel arrangement 19b) and the supporting bar 13 concerned is determined from the determined number of image pixels by means of known extents of the pixel-area units assigned to the image pixels (for example 1 mm×1 mm). On the basis of the determined distance (between the reference structure 19a and the supporting bar 13 concerned) and known distances between the reference structure 19a and the (discrete) possible suspension positions 15, the supporting bar 13 concerned can be assigned a suspension position 15, and consequently the suspension positions 15 of the supporting bar 13 in the pallet 3 can be determined.

If the two approaches for producing the contrast-image dataset presented by way of example are compared, the dark-field approach has the advantage of not being dependent on favorable ambient light. A further advantage is that the ground under the pallet 3 and the front side of the supporting bars 13 are not illuminated. This leads to less interference in the image. Correspondingly, the dark-field recording makes the assessment of whether a supporting bar has been placed at a suspension position 15 more robust. Scarcely any misclassifications occur. The dark-field recording also makes the assessment of the positions of individual supporting bar tips 17 on individual images possible with an acceptable error rate. Furthermore, carrying out the method by the dark-field approach and by the Fourier approach is quick, since the recording for the dark-field/Fourier analysis can be performed in fractions of a second.

In the case of the Fourier image analysis, a current supporting bar occupancy of the pallet can be extracted from the initial image directly and without any further aids, such as for example the specific dark-field illumination. Also in this case, unlike in the case of scanning methods, there are scarcely any lost times, since, as mentioned, the pallet is empty shortly before the placing on of a new metal sheet. All that the Fourier image analysis requires in implementation is a suitable data processing environment for the calculation of the transformations described. The calculations may be carried out on the controller of the machine tool or be outsourced to an external server. Accuracies of 96% and more have been achieved.

It is explicitly emphasized that all features disclosed in the description and/or the claims should be regarded as separate and independent of one another for the purpose of the original disclosure and likewise for the purpose of restricting the claimed invention independently of the combinations of features in the embodiments and/or the claims. It is explicitly stated that all range indications or indications of groups of units disclose any possible intermediate value or subgroup of units for the purpose of the original disclosure and likewise for the purpose of restricting the claimed invention, in particular also as a limit of a range indication.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for detecting a suspension position of a supporting bar in a pallet, which is fitted with a plurality of supporting bars along a longitudinal direction, the supporting bars comprising the supporting bar, each of the supporting bars having multiple supporting bar tips along a main direction of extent, which is aligned transversely to the longitudinal direction of the pallet, and the supporting bar tips of the plurality of supporting bars defining a supporting plane, the method comprising:

creating a two-dimensional contrast-image dataset of the pallet, having a plurality of image pixels, each of the image pixels being assigned a pixel value and a pixel-area unit of the supporting plane, and the contrast-image dataset comprising regions that are assigned to the supporting bar tips as local pixel-value extremes in a uniform pixel-value background;

determining a longitudinal position in the contrast-image dataset of the regions that are assigned to the supporting bar tips of one of the plurality of supporting bars using the local pixel-value extremes; and deducing the suspension position of the supporting bar in the pallet on the basis of the longitudinal position in the contrast-image dataset and an extent of the pixel-area unit in the longitudinal direction.

2. The method as claimed in claim 1, wherein one of the regions assigned to the supporting bar tips is assigned to a supporting bar tip or to a flank leading to the supporting bar tip.

3. The method as claimed in claim 1, wherein the uniform pixel-value background does not represent a structure or comprises image pixels that have a constant pixel value or an arbitrary pixel-value distribution about a constant pixel value.

4. The method as claimed in claim 1, wherein the creation of the contrast-image data set of the pallet also comprises:

producing a two-dimensional camera image of the pallet in the visible or infrared spectrum, the camera image comprising the image pixels arranged in rows and columns, to which the pixel-area unit of the supporting plane is respectively assigned;

Fourier transforming the camera image into a frequency domain and outputting a transformation-frequency dataset;

filtering the transformation-frequency dataset to emphasize frequencies in the frequency domain that belong to the regions that are assigned to the supporting bar tips; and transforming back the filtered transformation-frequency dataset into a back-transformed image dataset by an inverse Fourier transformation, and outputting the back-transformed image dataset as the contrast-image dataset.

5. The method as claimed in claim 4, wherein the supporting bar tips comprise adjacent supporting bar tips in the main direction of extent that have substantially the same tip spacing from one another, and wherein the filtering of the transformation-frequency dataset comprises:

identifying a frequency band assigned to the tip spacing in the frequency domain, the frequency band being formed around a tip repetition frequency, which is assigned to the main direction of extent, and being obtained from:

$$\frac{h * \Delta x}{d},$$

where:

h: is a number of pixels of the region of the supporting plane in the main direction of extent that is represented in the camera image, Δx: is the extent of the pixel-area unit in the main direction of extent and d: is the tip spacing of adjacent supporting bar tips; and restricting the transformation-frequency dataset to the frequency band.

6. The method as claimed in claim 4, wherein the production of the two-dimensional camera image is performed by producing a dark-field camera image of the pallet in the near-infrared frequency spectrum, and wherein the dark-field camera image is recorded from a recording direction that forms an angle with the supporting plane that lies in the range from 10° to 70°, and which extends at an angle in a range from 70° to 110° to the main direction of extent.

7. The method as claimed in claim 1, wherein the creation of the contrast-image data set of the pallet further comprises:

producing the contrast-image dataset by producing a dark-field camera image of the pallet in the near-infrared frequency spectrum from a recording direction, which forms an angle with the supporting plane which lies in the range from 10° to 70°, and which extends at an angle in a range from 70° to 110° to the main direction of extent.

8. The method as claimed in claim 1, wherein the creation of the contrast-image dataset of the pallet further comprises:

illuminating the pallet from above with light of a near-infrared frequency spectrum from one or more illumination directions.

9. The method as claimed in claim 8, wherein at least one of the illumination directions forms an angle with the supporting plane which is less than 30°, and the at least one of the illumination directions, projected into the supporting plane, forms an angle with a main direction of extent of the supporting bar which is less than 30°.

10. The method as claimed in claim 4, wherein the production of the two-dimensional camera image or the production of the two-dimensional dark-field camera image comprises:

recording multiple partial camera images, which in each case two-dimensionally represent a partial region of the pallet, and putting together the partial camera images to form the two-dimensional camera image or the two-dimensional dark-field camera image of the pallet.

11. The method as claimed in claim 1, wherein the determination of the longitudinal position in the contrast-image dataset comprises:

carrying out a template-matching image analysis by using a template, which is formed as an image dataset of a supporting bar having a plurality of supporting bar tips.

12. The method as claimed in claim 1, wherein the determination of the longitudinal position in the contrast-image dataset comprises:

summating the pixel values of the image pixels of the contrast-image dataset row-by-row in accordance with the main direction of extent, and outputting a first distribution of first pixel-value sums; and determining a local extreme in the first distribution, and outputting the row of the local extreme as a longitudinal position.

13. The method as claimed in claim 12, the method further comprising:

summating the pixel values of the image pixels of the contrast-image dataset column-by-column in accordance with the longitudinal direction in the region of the local extreme, and outputting a second distribution of second pixel-value sums;

determining multiple local extremes in the second distribution, and outputting the columns of the local extremes; and determining image positions of the regions in the contrast-image dataset that are assigned to the supporting bar tips on a basis of the corresponding row of the determined local extreme and the columns of the determined local extremes.

14. The method as claimed in claim 1, wherein:
the supporting bars are suspendable at predetermined suspension positions on one longitudinal side of the pallet, and the main direction of extent extends transversely to the longitudinal side,
the pallet has a reference structure, which is identifiable in the contrast-image dataset as a reference pixel arrangement, and
the deduction of the suspension position of the supporting bar in the pallet is performed by determining a distance between the reference pixel arrangement and the longitudinal position transversely to the main direction of extent in the contrast-image dataset and, on the basis of the distance determined, identifying one of the predetermined suspension positions for the longitudinal position.

15. The method as claimed in claim 1, wherein the pixel value is a gray value, a color value, or a brightness value.

16. A flatbed machine tool, with the flatbed machine tool comprising:
a pallet with multiple supporting bars suspended at suspension positions, each of the supporting bars having a plurality of supporting bar tips, which define a supporting plane;
a camera configured to produce a two-dimensional camera image, or a two-dimensional dark-field camera image, of the pallet; and
an evaluator,
wherein the camera or the evaluation device are configured to:
create a two-dimensional contrast-image dataset of the pallet, the two-dimensional contrast-image dataset having a plurality of image pixels, each of the image pixels being assigned a pixel value and a pixel-area unit of the supporting plane, and the contrast-image dataset comprising regions that are assigned to the supporting bar tips as local pixel-value extremes in a uniform pixel-value background, and
wherein the evaluator is configured to:
determine a longitudinal position in the contrast-image dataset of the regions that are assigned to the supporting bar tips of one of the plurality of supporting bars, using the local pixel-value extremes, and
deduce the suspension position of the supporting bar in the pallet on a basis of the longitudinal position in the contrast-image dataset and an extent of the pixel-area unit in the longitudinal direction.

17. The flatbed machine tool as claimed in claim 16, wherein the camera is further configured:
to produce the two-dimensional camera image of the pallet in the visible or infrared spectrum, the camera image having image pixels arranged in rows and columns to which a pixel-area unit of the supporting plane is respectively assigned, or
to produce a contrast-image dataset by recording the two-dimensional dark-field camera image of the pallet in the near-infrared frequency spectrum from a recording direction.

18. The flatbed machine tool as claimed in claim 17, wherein the evaluator comprises a processor which is configured:
to Fourier transform the camera image into a frequency domain, and to output a transformation-frequency dataset,
to filter the transformation-frequency dataset to emphasize frequencies in the frequency domain that belong to the regions which are assigned to the supporting bar tips, and
to transform the filtered transformation-frequency dataset back by an inverse Fourier transformation and to output the back-transformed dataset as the contrast-image dataset.

19. The flatbed machine tool as claimed in claim 16, further comprising:
at least one illumination device, which is configured to illuminate the pallet with light of a near-infrared frequency spectrum from one or more illumination directions.

* * * * *